United States Patent
Van Der Sijde et al.

(10) Patent No.: US 10,955,728 B2
(45) Date of Patent: Mar. 23, 2021

(54) DRIVER FOR AN ADAPTIVE LIGHT SOURCE

(71) Applicant: Lumileds LLC, San Jose, CA (US)

(72) Inventors: Arjen Van Der Sijde, Eindhoven (NL); Nicola Bettina Pfeffer, Eindhoven (NL); Yourii Martynov, Geldrop (NL)

(73) Assignee: Lumileds LLC, San Jose, CA (US)

( * ) Notice: Subject to any disclaimer, the term of this patent is extended or adjusted under 35 U.S.C. 154(b) by 96 days.

(21) Appl. No.: 16/071,777

(22) PCT Filed: Jan. 10, 2017

(86) PCT No.: PCT/EP2017/050377
§ 371 (c)(1),
(2) Date: Jul. 20, 2018

(87) PCT Pub. No.: WO2017/125280
PCT Pub. Date: Jul. 27, 2017

(65) Prior Publication Data
US 2019/0025672 A1 Jan. 24, 2019

Related U.S. Application Data

(60) Provisional application No. 62/280,918, filed on Jan. 20, 2016.

(30) Foreign Application Priority Data

Mar. 18, 2016 (EP) .................................... 16161053

(51) Int. Cl.
G03B 15/03 (2006.01)
H04N 5/225 (2006.01)
(Continued)

(52) U.S. Cl.
CPC ........... *G03B 15/03* (2013.01); *H04N 5/2256* (2013.01); *H04N 5/2354* (2013.01); *H04N 5/3532* (2013.01); *G03B 2215/0567* (2013.01)

(58) Field of Classification Search
CPC .............................. G03B 15/03; H04N 5/2256
(Continued)

(56) References Cited

U.S. PATENT DOCUMENTS 6,473,062 B1 * 10/2002 Debiez .................. H04N 1/401
345/46
7,920,205 B2 * 4/2011 Awazu .................. G03B 15/02
348/371

(Continued)

FOREIGN PATENT DOCUMENTS

WO WO-2017125280 A1 7/2017

OTHER PUBLICATIONS

"International Application Serial No. PCT/EP2017/050377, International Preliminary Report on Patentability dated Aug. 2, 2018", 8 pgs.

(Continued)

*Primary Examiner* — Clayton E. LaBalle
*Assistant Examiner* — Dennis Hancock
(74) *Attorney, Agent, or Firm* — Schwegman Lundberg & Woessner, P.A.

(57) ABSTRACT

A method according to embodiments of the invention includes, for a field of view comprising a plurality of portions, determining an amount of light for each portion. LEDs corresponding to each portion are selectively energized over a plurality of time periods, such that a sum of illumination generated by each LED during the plurality of time periods equals the determined amount of light. An image of the field of view is captured, for example by a camera.

10 Claims, 9 Drawing Sheets

(51) Int. Cl.
*H04N 5/235* (2006.01)
*H04N 5/353* (2011.01)

(58) Field of Classification Search
USPC .......................................................... 396/155
See application file for complete search history.

(56) References Cited

U.S. PATENT DOCUMENTS

| | | | | |
|---|---|---|---|---|
| 8,761,594 | B1* | 6/2014 | Gross | H04N 5/2354 |
| | | | | 396/155 |
| 2002/0191102 | A1* | 12/2002 | Yuyama | H04N 5/2256 |
| | | | | 348/370 |
| 2008/0245952 | A1* | 10/2008 | Troxell | H04N 5/2354 |
| | | | | 250/208.1 |
| 2009/0073275 | A1 | 3/2009 | Awazu | |
| 2013/0064531 | A1 | 3/2013 | Pillman et al. | |
| 2014/0217901 | A1 | 8/2014 | Logiudice | |
| 2015/0292884 | A1* | 10/2015 | Fuchikami | G01P 13/00 |
| | | | | 348/135 |
| 2017/0127052 | A1* | 5/2017 | Reichow | H04N 9/3164 |
| 2017/0135169 | A1* | 5/2017 | Panek | H05B 45/20 |

OTHER PUBLICATIONS

"International Application Serial No. PCT/EP2017/050377, International Search Report dated Feb. 27, 2017", 3 pgs.
"International Application Serial No. PCT/EP2017/050377, Written Opinion dated Feb. 27, 2017", 6 pgs.

* cited by examiner

DRIVER FOR AN ADAPTIVE LIGHT SOURCE

BACKGROUND

Semiconductor light-emitting devices including light emitting diodes (LEDs), resonant cavity light emitting diodes (RCLEDs), vertical cavity laser diodes (VCSELs), and edge emitting lasers are among the most efficient light sources currently available. Material systems currently of interest for manufacturing of high-brightness light emitting devices capable of operation across the visible spectrum include Group III-V semiconductors, particularly binary, ternary, and quaternary alloys of gallium, aluminum, indium, and nitrogen, also referred to as III-nitride materials. Typically, III-nitride light emitting devices are fabricated by epitaxially growing a stack of semiconductor layers of different compositions and dopant concentrations on a sapphire, silicon carbide, III-nitride, or other suitable substrate by metal-organic chemical vapor deposition (MOCVD), molecular beam epitaxy (MBE), or other epitaxial techniques. The stack often includes one or more n-type layers doped with, for example, Si, formed over the substrate, one or more light emitting layers in an active region formed over the n-type layer or layers, and one or more p-type layers doped with, for example, Mg, formed over the active region. Electrical contacts are formed on the n- and p-type regions.

Due to their compact size and low power requirements, semiconductor light-emitting devices are attractive candidates for light sources such as camera flashes for hand-held, battery-powered devices, such as cameras and cell phones.

US 2013/0064531 A1 discloses a camera system having an image forming system, an electronic flash with a variable illumination angle and a flash controller. The electronic flash includes a plurality of fixed focal length illumination lenses, having two or more different focal lengths and one or more light emitters positioned behind each illumination lens. The flash controller selectively fires different subsets of light emitters responsive to the selected field-of-view of the image forming system.

SUMMARY

According to embodiments of the invention, a light source is provided which may be used, for example, as a flash for a camera, or for any other suitable use. The light source is configured such that the illumination pattern emitted by the light source may be altered. For example, when used as a camera flash, for a given scene in the field of view of the camera, the light source may provide more light to parts of the scene that are not well lit by ambient light, and less light to parts of the scene that are well lit by ambient light.

DETAILED DESCRIPTION

Though in the description below, embodiments of the invention are described as camera flashes, other uses are contemplated and are within the scope of the invention.

One problem with all camera flashes is that objects close to the camera are often overexposed while objects further from the camera do not get enough light. Embodiments of the invention include a light source such as a camera flash, for example for a portable or battery-powered device, or for a larger non-battery-powered photo studio flash. Light sources according to embodiments of the invention may adapt their illuminance profiles to the scene and deliver the right amount of light to all objects on the scene. The adaptive light source according to embodiments of the invention may include a semiconductor light source such as a semiconductor light-emitting device, thought any suitable light may be used.

Figure 1:
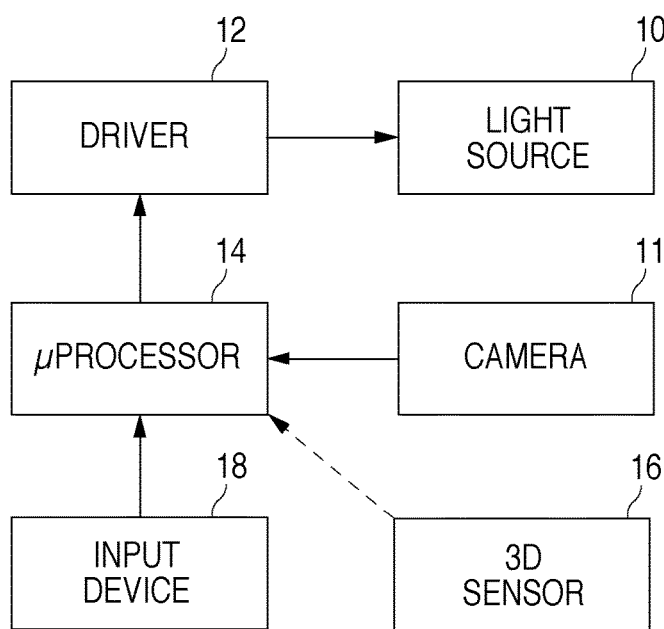
FIG. 1 is a block diagram illustrating a system including at least one semiconductor light-emitting device as a light source.

FIG. 1 illustrates an example of an adaptive light source, according to embodiments of the invention. The system illustrated in FIG. 1 may be included in a smart phone or any suitable device. The system illustrated in FIG. 1 includes a light source 10 connected to a driver 12. The driver 12 supplies power to the light source 10, as described below. The driver 12 is connected to a microprocessor 14. The microprocessor receives input from an input device 18 and camera 11. The system may also include 3D sensor 16. The input device 18 may be, for example, a user-activated input device such as a button that a user presses to take a picture. The input device 18 may not require a user input in some embodiments, such as in the case where a picture is taken automatically. The input device 18 may be omitted in some embodiments.

The 3D sensor 16 may be any suitable sensor capable of making a 3D profile of the scene, prior to taking a picture. In some embodiments, 3D sensor 16 may be a time of flight (ToF) camera. A ToF camera measures the time it takes for light reflected from objects to travel back to the ToF camera. The time may be used to calculate the distance to each object in the scene. In some embodiments, 3D sensor 16 may be a structured light sensor. A structured light sensor includes a projection device that projects a specially designed pattern of light on the scene. A camera also included in the structured light sensor measures the position of each part of the light pattern reflected from the objects of the scene and determines the distance to these objects by triangulation. In some embodiments, 3D sensor 16 may be an auxiliary camera or cameras positioned at a distance from each other in the body of the device. By comparing the position of the objects as seen by the auxiliary cameras, distances to each object can be determined by triangulation. In some embodiments, 3D sensor 16 is the autofocus signal of the main camera in the device. While scanning the focus position of the camera lens, the system can detect at which positions which parts of the scene are in focus. A 3D profile of the scene is then built by translating the corresponding lens positions into the distances to the objects that are in focus for these positions. A suitable autofocus signal is derived by conventional methods, for example by measuring the contrast or by utilizing phase detection sensors within the camera sensor. When phase detection sensors are used, in some embodiments, for optimal functioning of the adaptive flash, the positions of individual phase detection sensors may correspond to areas illuminated by separate segments of the light source 10, as described below.

Figure 2A:
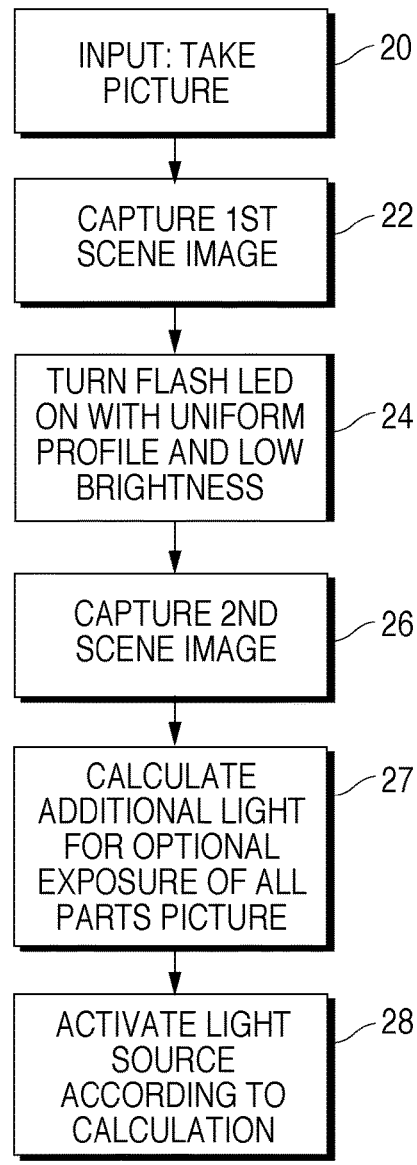
FIGS. 2A, 2B, and 2C illustrate methods of illuminating a scene using, for example, the system of FIG. 1.

One example of method for using the system illustrated in FIG. 1 is illustrated in FIG. 2A. In block 20 an input is generated, for example instructing that a picture be taken. In block 22 camera 11 takes a first preliminary image of the scene (corresponding to the camera's field of view) with flash turned off. In block 24 light source 10 is turned on in low light output mode (typically called "torch mode"). At this time the illuminance profile of the light source 10 is kept uniform where "uniform" means all portions of the scene are illuminated with a known illumination profile. In block 26 a second preliminary image is captured while light source 10 continues to be on with uniform illuminance profile and low brightness. In block 27 the system calculates the optimum brightness for all parts of the scene to achieve optimal exposure. This can be done by subtracting the pixel brightness values of first preliminary image from the respective pixel brightness values of second image, and scaling the differences to achieve the optimal exposure levels. In block 28 the final picture is taken by camera 11 with the light source 10 activated according to the illuminance profile calculated in block 27.

Figure 2B:
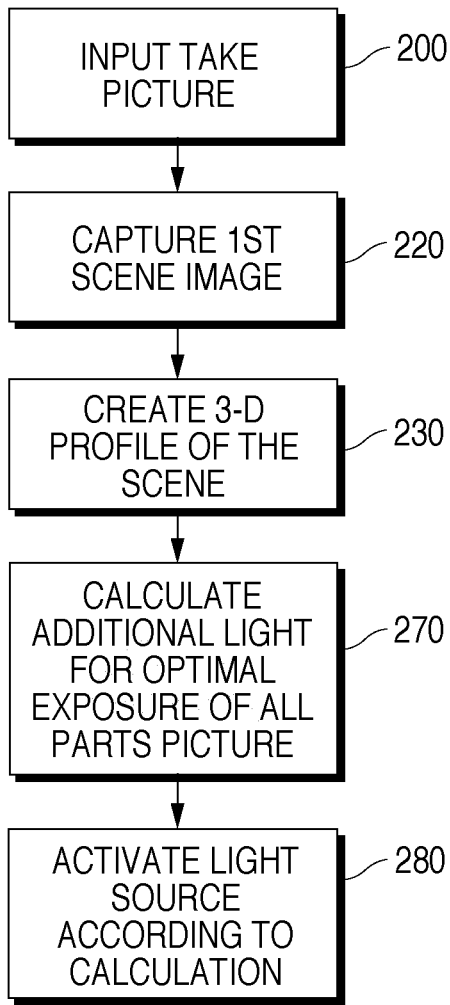

Another example of method for using the system illustrated in FIG. 1 is illustrated in FIG. 2B. In block 200, an input is generated, for example instructing that a picture be taken. In block 220 camera 11 takes a first preliminary image of the scene (corresponding to the camera's field of view) with flash turned off. In block 230, a 3D profile of the scene is generated. For example, 3D sensor 16 may generate the 3D profile of the scene, or 3D sensor 16 may sense data about the scene and transmit the data to microprocessor 14, which may generate the 3D profile of the scene. In block 270 the system calculates the optimum brightness for all parts of the scene to achieve optimal exposure. In block 280, based on the calculation performed in block 270, the scene is illuminated by the light source.

Figure 2C:
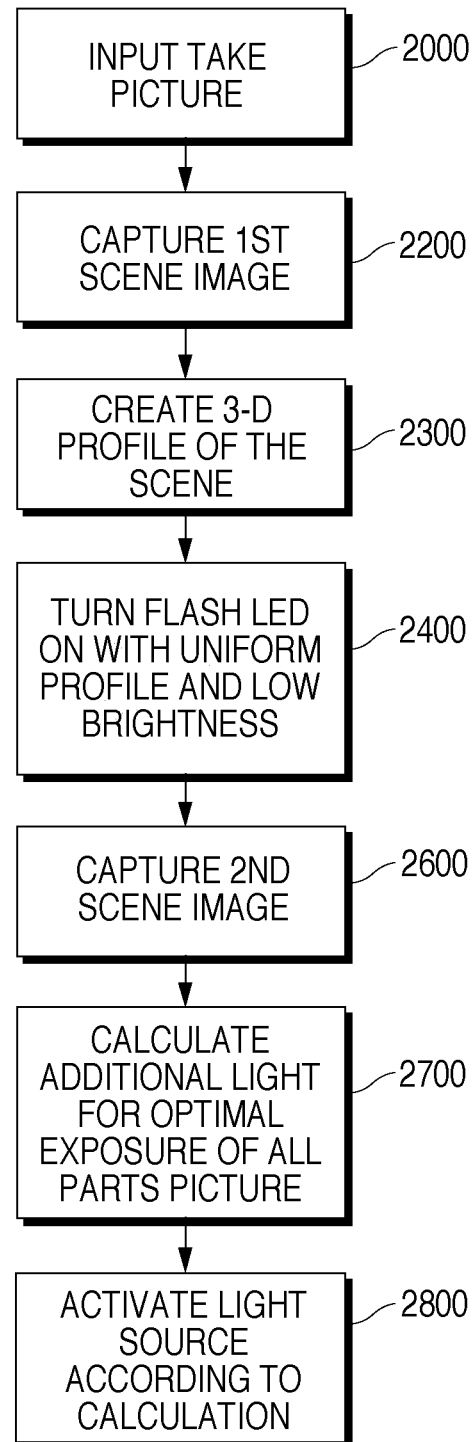

Another example of method for using the system illustrated in FIG. 1 is shown in FIG. 2C. In block 2000 an input is generated, for example instructing that a picture be taken. In block 2200 camera 11 takes a first preliminary image of the scene (corresponding to the camera's field of view) with flash turned off. In block 2300, a 3D profile of the scene is generated. In block 2400, light source 10 is turned on in low light output mode (typically called "torch mode"). At this time the illuminance profile of the light source 10 is kept uniform where "uniform" means all portions of the scenes are illuminated. In block 2600 a second preliminary image is captured with light source 10 in torch mode. In block 2700 the system calculates the optimum brightness for all parts of the scene to achieve optimal exposure based on the input of the 2 images taken and the 3D profile as described above in the text accompanying FIG. 2A and FIG. 2B. In block 2800 the final picture is taken by camera 11 with the light source 10 activated according to the illuminance profile calculated in block 2700.

Figure 3:
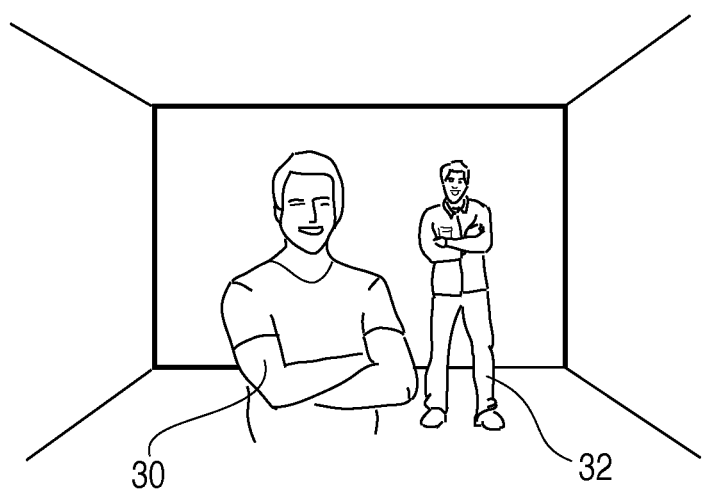
FIG. 3 illustrates a scene to be illuminated.

In each of FIGS. 2A, 2B, and 2C, the input may be, for example, a user input such as the user pushing a button, an input generated by microprocessor 14 (for example, if microprocessor 14 is programmed to take a picture at a predetermined time, or at a predetermined interval), or any other suitable input. FIG. 3 illustrates a scene to be captured in a picture when the input is generated. The scene illustrated in FIG. 3 includes a first person 30 in the foreground, and a second person 32 in the background. This scene is selected for illustration purposes only. Other scenes with multiple objects or persons at various distances from the camera are also suitable for use of the present invention.

Figure 4:
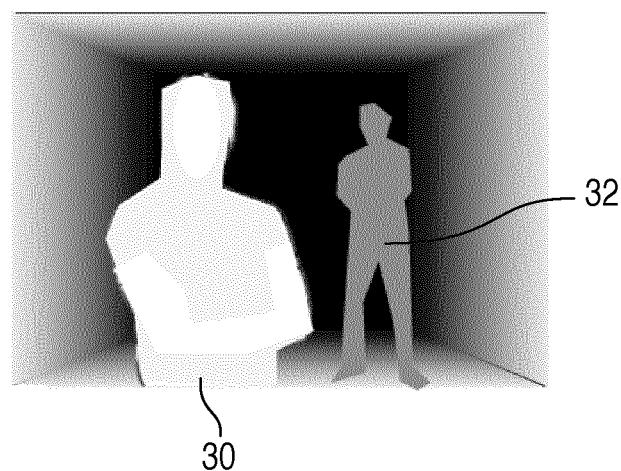
FIG. 4 illustrates a three dimensional (3D) map of the scene illustrated in FIG. 3.

FIG. 4 illustrates the 3D profile for the scene illustrated in FIG. 3. In FIG. 4, the lighter shades correspond to shorter distance from the camera; darker shades correspond to larger distance from the camera. Accordingly, the person 30 in the foreground has the lightest shading, indicating the person 30 is closest to the camera. The person 32 in the background has darker shading, indicating the person 32 is further from the camera. The background is black, indicating the furthest distance from the camera Objects located far from the flash may receive higher light intensity; objects located closer to the flash may receive less light. As is well-known, illuminance of light decreases according to the inverse square law of distance (Illuminance~$1/\text{distance}^2$). With the 3D profile of the scene the required amount of light to distribute to which portions of the scene can therefore be calculated. The algorithm calculating the required intensity profile may also take into account the illuminance that each of the objects in the scene receives from ambient light, information gathered with the capture of a $1^{st}$ image, and may adjust the amount of flash light accordingly. For example, objects 30 that are already well-illuminated, for example because they are lightly colored or reflective, may receive less light; objects that are not well-illuminated, for example because they are dark or not reflective, may receive more light than may be calculated solely based on their distance from the light source, as determined by the 3D profile.

Digital cameras and their image processors typically include face recognition algorithms. In some embodiments, information from a face recognition algorithm may be used to better illuminate faces compared to other objects. If there is not enough light to expose the complete picture well, faces benefit from more light. If the person is too close and there is a danger of overexposure, this feature should be turned off, such that more light is not directed to the face. In some embodiments, the calculation of relative light from the 3D profile may reduce the amount of light sent towards the eyes of the person to minimize "red eye" in the picture.

In some embodiments, the calculation of relative light from the 3D profile may identify parts of the scene that are very far from the flash and cannot be properly illuminated. A minimal amount of light is sent to these parts of the scene, in order to maximize the amount of light sent towards the useful parts of the scene and thus provide better use of available drive current capability.

In some embodiments, a user interface (for example, the touch screen on a smart phone) may allow a user control over the relative amount of light sent to each portion of the scene. For example, the user may turn adaptive features of the flash on and off, may turn various parts of the algorithm used to calculate the relative light from the 3D profile (described above) on and off, and may manually create flash accents on the scene.

Several illumination modes are contemplated by embodiments of the invention.

In some embodiments, in a first group of illumination modes, illumination from light source 10 is distributed across the scene to achieve the most homogenously useful illuminated picture. In particular, in some embodiments, overexposure is minimized: in the case where foreground is well illuminated by ambient light, all light from light source 10 is directed to the background. In some embodiments, the light source acts as a fill in flash: in the case where the background is well illuminated by ambient light, all light from light source 10 is directed to foreground. In some embodiments, when the foreground and the background are evenly illuminated by ambient lighting, light from light source 10 may be send mostly to the background. In some embodiments, in the case of a dark foreground, light from light source 10 illuminates the foreground just enough for a good picture, and the rest of the light from light source 10 is sent to the background.

In some embodiments, in a second group of illumination modes, selected objects are illuminated. In particular, in some embodiments, in combination with face recognition, faces may be weighted highest for best illumination. In some embodiments, in combination with face recognition, background around faces (or other objects) may receive less light, for example to increase contrast between the illuminated face and the background nearest the face. In some embodiments, selected zones of the scene are identified for example by a user input. Light from light source 10 may be directed only within the selected zone. Examples of selected zones include zoomed-in images, or otherwise-identified portions of the scene. In some embodiments, for pictures of, for example, business cards, light from light source 10 may be emitted with a very high uniformity level.

Figure 5:
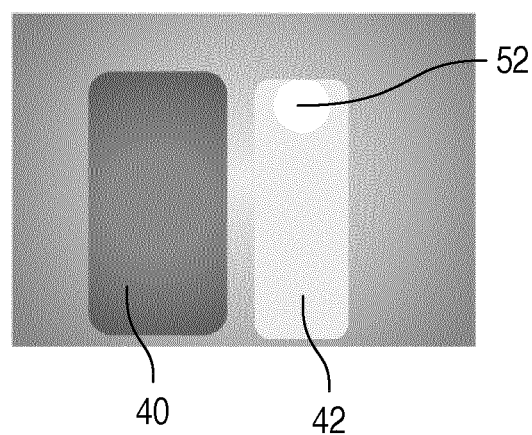
FIG. 5 illustrates a flash intensity profile for the scene illustrated in FIG. 3.

FIG. 5 illustrates light provided to the scene of FIG. 3 based on the calculation illustrated in FIG. 4. In FIG. 5, lighter shading corresponds to more light from light source 10, and darker shading corresponds to less light from light source 10. As illustrated in FIG. 5, more light is provided in region 42, corresponding to the background person 32, while less light is provided in region 40, corresponding to foreground person 30. Extra light is provided to the face 52 of the person in the background. The least amount of light may be provided to the background where neither person 30 nor person 32 appears (not shown).

Figure 6:
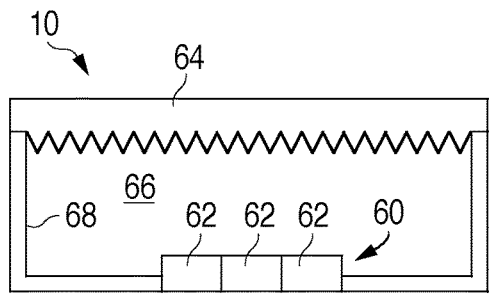
FIG. 6 is a cross sectional view of one example of a light source.
Figure 7:
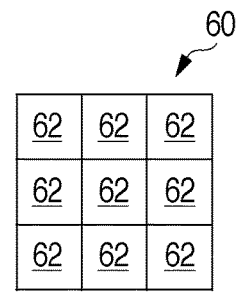
FIG. 7 is a top view of an array of LEDs.
Figure 8:
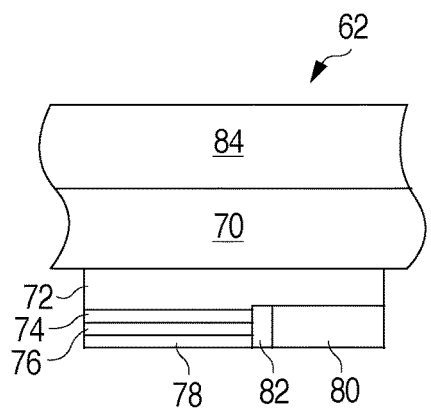
FIG. 8 is a cross sectional view of one LED in the array of FIG. 7.

FIGS. 6, 7, and 8 illustrate one example of a light source 10, which may be used in the system illustrated in FIG. 1. Any suitable light source may be used and embodiments of the invention are not limited to the structures illustrated in FIGS. 6, 7, and 8.

Though in the examples below the semiconductor light emitting device are III-nitride LEDs that emits blue or UV light, semiconductor light emitting devices besides LEDs such as laser diodes and semiconductor light emitting devices made from other materials systems such as other III-V materials, III-phosphide, III-arsenide, II-VI materials, ZnO, or Si-based materials may be used.

FIG. 7 is a top view of a square array 60 of LEDs 62. The LEDs 62 may be monolithically grown on a single substrate. Alternatively, the LEDs 62 need not be monolithically grown on a single substrate, but may be diced then arranged on a mount such that neighboring LEDs are very close together. In some embodiments, the gap between LEDs 62 is less than ⅓ of a dimension (for example, the width) of an individual LED 62. Though a 3×3 square array is illustrated, any suitable number of LEDs may be used, and the array need not be square, it may be rectangular or any suitable shape. The size of individual LEDs may depend on several design parameters as, for example, building volume with optical lens included, field of view of the camera and number of LEDs in the array. For example, the array must include enough LEDs to illuminate the total field of view of the camera (i.e. the entire scene). For smart phone applications, the total width of the array may be no more than 2 mm in some embodiments. For larger cameras, the width of the array may be no more than 10 mm in some embodiments. Though the individual LEDs are square, this is not required; rectangular LEDs or LEDs of any suitable shape may be used.

FIG. 6 is a cross sectional view of the light source 10. The array 60 of LEDs 62 is positioned such that a majority of light extracted from the array 60 is emitted toward an optic 64. In the example illustrated, optic 64 is spaced apart from the array 60. Alternatively, the optic 64 may be placed on top of array 60. Optic 64 may be any suitable structure that collimates the light and directs light to the appropriate area of the scene. Optic 64 may be, for example, a lens, multiple lenses, one or more Fresnel lenses, one or more refractive lens, one or more total internal reflection lens elements, one or more reflectors, one or more collimators, or any other suitable optic. In the examples below, optic 64 is a Fresnel lens. The light source may be in the shape of a box 66, with the array 60 disposed on a bottom of the box, and the optic 64 forming the top of the box. Interior sidewalls 68 of the box, any portion of the bottom that is not occupied by the array 60, and any portion of the top that is not occupied by the optic 64, are part of the optical design, and therefore may be reflective or light absorbing as appropriate. Though in the device of FIG. 6 a single optic is disposed over multiple LEDs, in other embodiments, an optic may be disposed over each individual LED, or over groups of LEDs that are smaller than the total number of LEDs in the array.

FIG. 8 is a cross sectional view of one example of a single LED 62 in the array illustrated in FIGS. 6 and 7. Any suitable LED may be used and embodiments of the invention are not limited to the structure illustrated in FIG. 8. In the device of FIG. 8, a majority of light is extracted from the LED through the growth substrate. Such a device may be referred to as a flip chip device. The LED of FIG. 8 is formed by growing a III-nitride semiconductor structure on a growth substrate 70 as is known in the art. The growth substrate is often sapphire but may be any suitable substrate such as, for example, a non-III-nitride material, SiC, Si, GaN, or a composite substrate. A surface of the growth substrate on which the III-nitride semiconductor structure is grown may be patterned, roughened, or textured before growth, which may improve light extraction from the device. A surface of the growth substrate opposite the growth surface (i.e. the surface through which a majority of light is extracted in a flip chip configuration) may be patterned, roughened or textured before or after growth, which may improve light extraction from the device.

The semiconductor structure includes a light emitting or active region sandwiched between n- and p-type regions. An n-type region 72 may be grown first and may include multiple layers of different compositions and dopant concentration including, for example, preparation layers such as buffer layers or nucleation layers, which may be n-type or not intentionally doped, and n- or even p-type device layers designed for particular optical, material, or electrical properties desirable for the light emitting region to efficiently emit light. A light emitting or active region 74 is grown over the n-type region. Examples of suitable light emitting regions include a single thick or thin light emitting layer, or a multiple quantum well light emitting region including multiple thin or thick light emitting layers separated by barrier layers. A p-type region 76 may then be grown over the light emitting region. Like the n-type region, the p-type region may include multiple layers of different composition, thickness, and dopant concentration, including layers that are not intentionally doped, or n-type layers.

After growth of the semiconductor structure, a reflective p-contact 78 is formed on the surface of the p-type region. The p-contact 78 often includes multiple conductive layers such as a reflective metal and a guard metal which may prevent or reduce electromigration of the reflective metal. The reflective metal is often silver but any suitable material or materials may be used. After forming the p-contact 78, a portion of the p-contact 78, the p-type region 76, and the active region 74 is removed to expose a portion of the n-type region 72 on which an n-contact 80 is formed. The n- and p-contacts 80 and 78 are electrically isolated from each other by a gap 82 which may be filled with a dielectric such as an oxide of silicon or any other suitable material. Multiple n-contact vias may be formed; the n- and p-contacts 80 and 78 are not limited to the arrangement illustrated in FIG. 8. The n- and p-contacts may be redistributed to form bond pads with a dielectric/metal stack, as is known in the art (not shown).

As described above, the LEDs 62 in the array 60 may be formed on a single wafer, then diced from the wafer as an array 60 with individual LEDs 62 in the array still attached to a single growth substrate portion. Alternatively, many LEDs 62 may be formed on a single wafer, then diced from the wafer, such that already-diced, individual LEDs are disposed on a mount to form array 60.

The substrate 70 may be thinned after growth of the semiconductor structure or after forming the individual devices. In some embodiments, the substrate is removed from the device of FIG. 8. A majority of light extracted from the device of FIG. 8 is extracted through the substrate 70 (or the surface of the semiconductor structure exposed by removing the substrate 70). Embodiments of the invention are not limited to flip chip LEDs—any suitable device may be used.

A wavelength converting structure 84 may be disposed in the path of light extracted from the light emitting device. The wavelength converting structure includes one or more wavelength converting materials which may be, for example, conventional phosphors, organic phosphors, quantum dots, organic semiconductors, II-VI or III-V semiconductors, II-VI or III-V semiconductor quantum dots or nanocrystals, dyes, polymers, or other materials that luminesce. The wavelength converting material absorbs light emitted by the LED and emits light of one or more different wavelengths. Unconverted light emitted by the LED is often part of the final spectrum of light extracted from the structure, though it need not be. The final spectrum of light extracted from the structure may be white, polychromatic, or monochromatic. Examples of common combinations include a blue-emitting LED combined with a yellow-emitting wavelength converting material, a blue-emitting LED combined with green- and red-emitting wavelength converting materials, a UV-emitting LED combined with blue- and yellow-emitting wavelength converting materials, and a UV-emitting LED combined with blue-, green-, and red-emitting wavelength converting materials. Wavelength converting materials emitting other colors of light may be added to tailor the spectrum of light extracted from the structure. The wavelength converting structure 84 may include light scattering or light diffusing elements such as $TiO_2$.

In some embodiments, the wavelength converting structure 84 is a structure that is fabricated separately from the LED and attached to the LED, for example through wafer bonding or a suitable adhesive such as silicone or epoxy. One example of such a pre-fabricated wavelength converting element is a ceramic phosphor, which is formed by, for example, sintering powder phosphor or the precursor materials of phosphor into a ceramic slab, which may then be diced into individual wavelength converting elements. A ceramic phosphor may also be formed by, for example tape casting, where the ceramic is fabricated to the correct shape, with no dicing or cutting necessary. Examples of suitable non-ceramic pre-formed wavelength converting elements include powder phosphors that are dispersed in transparent material such as silicone or glass that is rolled, cast, or otherwise formed into a sheet, then singulated into individual wavelength converting elements, powder phosphors that are disposed in a transparent material such as silicone and laminated over the wafer of LEDs or individual LEDs, and phosphor mixed with silicone and disposed on a transparent substrate. The wavelength converting element need not be pre-formed, it may be, for example, wavelength converting material mixed with transparent binder that is laminated, dispensed, deposited, screen-printed, electrophoretically deposited, or otherwise positioned in the path of light emitted by the LEDs.

The wavelength converting structure 84 need not be disposed in direct contact with the LEDs as illustrated in FIG. 8; in some embodiments, the wavelength converting structure 84 is spaced apart from the LEDs.

The wavelength converting structure 84 may be a monolithic element covering multiple or all LEDs in an array, or may be structured into separate segments, each attached to a corresponding LED. Gaps between these separate segments of the wavelength conversion structure 84 may be filled with optically reflective material to confine light emission from each segment to this segment only.

Interconnects (not shown) such as, for example, solder, stud bumps, gold layers, or any other suitable structure, may be used to electrically and physically connect the LEDs 62 in the array 60 to a structure such as a mount, a printed circuit board, or any other suitable structure. The mount may be configured such that individual LEDs 62 may be individually controlled by driver 12 of FIG. 1. The light emitted by the individual LEDs 62 illuminates a different part of the scene. By changing the current to individual LEDs, the light provided to a corresponding part of the scene can be modified. The optimal illuminance profile for the scene, calculated as described above, may be obtained by providing an appropriate level of current to each LED 62.

In some devices such as mobile or battery-powered devices, the maximum amount of current available for the adaptive light source of FIG. 1 is often limited by the capabilities of the device battery. When defining the drive current levels to all the LEDs 62, the system typically takes into account the maximum available current budget, and thereby defines the drive current level for each LED 62 such that the total drive current does not exceed the maximum, while the correct ratio of intensity between the LEDs is maintained and total light output is maximized.

Figure 9:
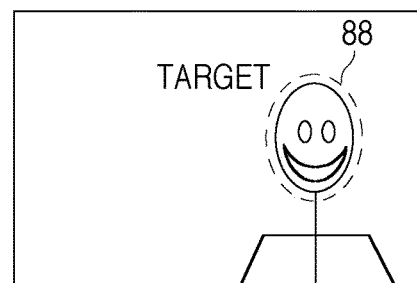
FIG. 9 illustrates the scene that is illuminated in the examples in the following figures.
Figure 10A:
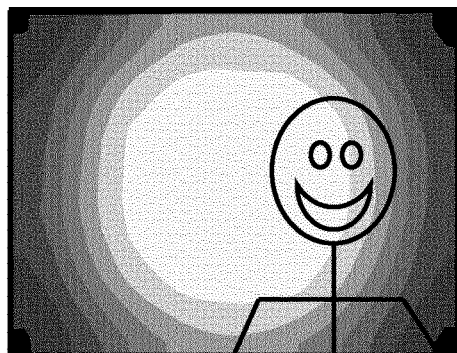
FIGS. 10A and 11A illustrate different illuminance profiles for the scene illustrated in FIG. 9.
Figure 10B:
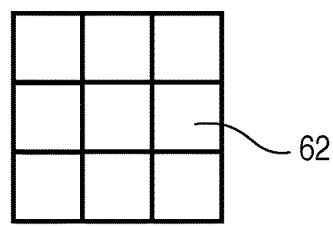
FIGS. 10B and 11B illustrate the amount of current applied to the LEDs in the array of FIG. 7 to generate the illuminance profiles illustrated in FIGS. 10A and 11A.
Figure 11A:
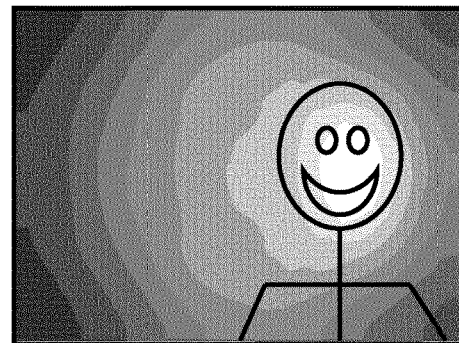
Figure 11B:
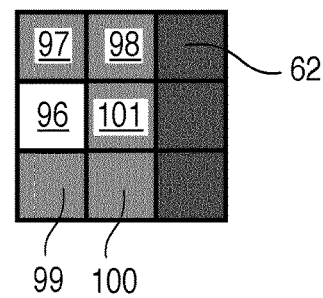

FIG. 9 illustrates a scene to be illuminated in the examples illustrated below in FIGS. 10A and 11A. The amount of current provided to each LED for each example is illustrated in FIGS. 10B and 11B. The target 88, identified by the dashed line in FIG. 9, requires more light than the rest of the scene, according to the calculation from the 3D profile, described above. In FIGS. 10A and 11A, the amount of light provided to a region decreases with increasing darkness of the shading. The light distributions illustrated in each figure may be relative.

FIG. 10A illustrates how the scene is illuminated when all LEDs 62 are supplied with the same amount of current, as illustrated in FIG. 10B. The center of the scene is brightly illuminated, while the outer edges of the scene are less illuminated. Accordingly, the portion of the target near the center of the scene is more illuminated than the portion of the target near the edge of the scene.

FIG. 11A illustrates how the scene is illuminated when six LEDs are supplied with varying levels of current and three LEDs receive no current. The center LED 96 in the left column is supplied with five times more current than the five LEDs 97, 98, 99, 100, and 101 which surround LED 96. The three LEDs in the right column receive no current, as illustrated in FIG. 11B. As illustrated in FIG. 11A, the right side of the scene, corresponding roughly to the target, is more brightly illuminated than the rest of the scene.

Embodiments of the invention are directed to the driver 12 of FIG. 1, and methods of using the driver to illuminate a scene, such as a camera's field of view. In the examples below, the light source 10 is an array 60 of 12 LEDs, arranged into four columns, each with three rows. As described above, embodiments of the invention are not limited to this arrangement. The principles described below may be generalized to any suitable array of light emitting devices.

Figure 12:
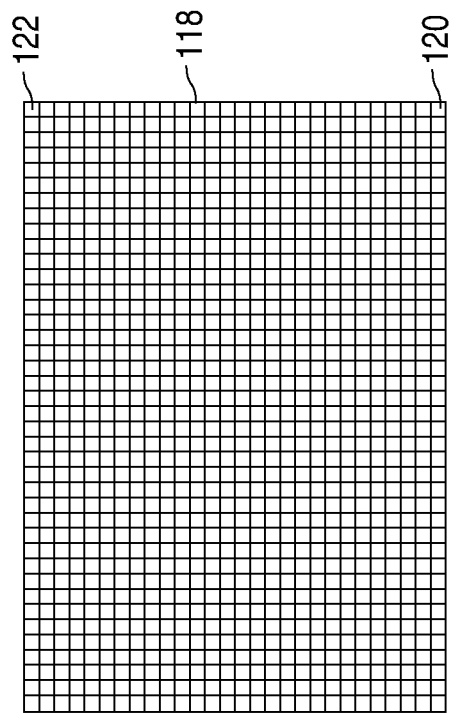
FIG. 12 illustrates a sequence of events performed during the taking of a picture.
Figure 12:
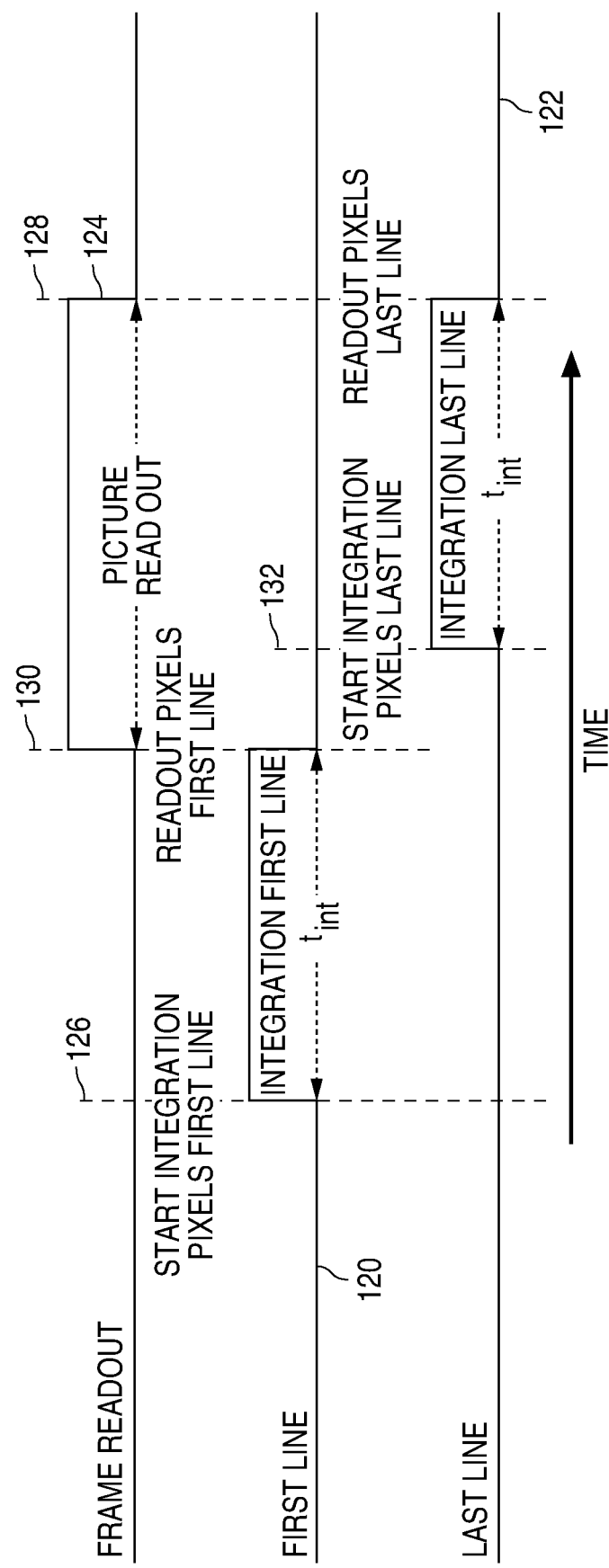

FIG. 12 illustrates a sequence of events, as a function of time, that occurs when a picture is taken with a camera with rolling shutter. Any suitable camera may be used. In some embodiments, the camera uses a rolling shutter. Rolling shutter refers to a method of image capture in which a still picture is captured by scanning across the scene, rather than by capturing the entire scene at once. Rolling shutter cameras are often implemented with digital CMOS sensors. The "picture" is essentially a group of pixels 118. When the picture is taken, the information in the individual pixels must be captured. The process of capturing the information in the pixels is called integration. The pixels cannot all be integrated simultaneously with rolling shutter, and are accordingly typically integrated line by line. For example, bottom line 120 in FIG. 12 is integrated first, and top line 122 is integrated last. The integration of the first line 120 begins at time 126 and ends at time 130. After the integration of the first line 120 begins at time 126, and before it ends, integration of the next line begins, and so on up the lines of pixels. The integration of the last line 122 begins at time 132 and ends at time 128. Only the integration times of first line 120 and last line 122 are illustrated in FIG. 12; intervening lines are omitted for clarity.

The frame read out 124, i.e. the taking of the picture, begins at time 130, as integration of the first line 120 ends, and ends at time 128, as the integration of last line 122 ends. The adaptive flash must illuminate the scene corresponding to the pixels, from time 126 when integration of the first line 120 beings, until time 128, when frame read out and integration of the last line of pixels ends. In some embodiments, the adaptive flash illuminates the scene before time 126, and after time 128, to be sure the flash is on during all of the operations illustrated in FIG. 12.

The following figures illustrated examples of structures and methods for illuminating the scene as described above, for example in blocks 28, 280, and 2800 of FIGS. 2A, 2B, and 2C, and in the description of FIG. 12.

Figure 13:
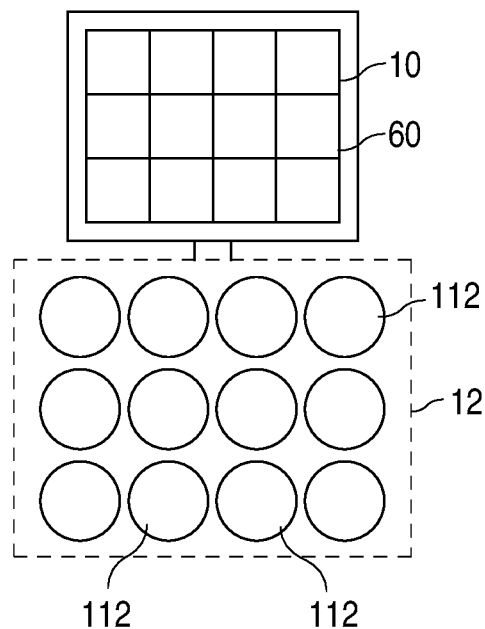
FIG. 13 illustrates a system with a driver circuit for each LED in an array.

FIG. 13 illustrates a structure where the driver 12 includes 12 individual driver circuits 112, one to control each LED in the array 60. Each driver 112 supplies the LED corresponding to that driver with the required amount of current to illuminate the scene according to the calculations described above in FIGS. 2A, 2B, and 2C. Each LED may be supplied by its corresponding driver with the appropriate amount of current for the entire duration of time 126 through time 128. This approach requires as many driver circuits 112 as there are LEDs in the LED array, which may be costly, and multiple solder pads, as illustrated in FIG. 14.

Figure 14:
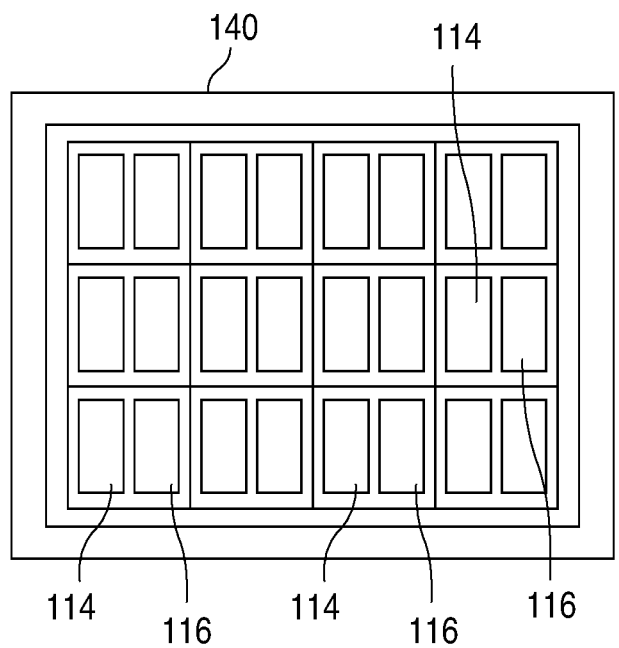
FIG. 14 is a top view of solder connections on a mount, for the light source of the system of FIG. 13.

FIG. 14 illustrates a mount 140 on which the array 60 of FIG. 13 may be mounted. The mount includes individual anode 114 and cathode 116 solder pads for each LED, in order to facilitate connecting each individual LED to an individual driver. Providing this number of solder pads and current paths may be costly, and may complicate fabrication of the light source 10.

To reduce the number of contact pads and of drivers, matrix driving has been proposed, for example for projection and display applications. Matrix driving refers to connecting an LED array to, for example, a matrix of row and column conductive address lines. One terminal of each LED (for example, anode) is connected to a row line; another terminal (for example, cathode) is connected to a column line. In order to activate a given LED, the corresponding row and column must be switched on.

Figure 15:
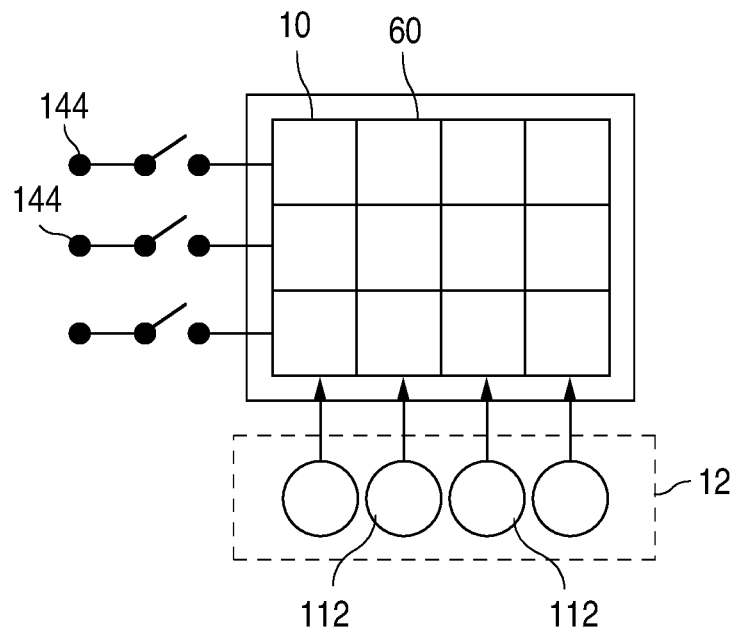
FIG. 15 illustrates a system with a driver circuit for each column of LEDs in an array.
Figure 16:
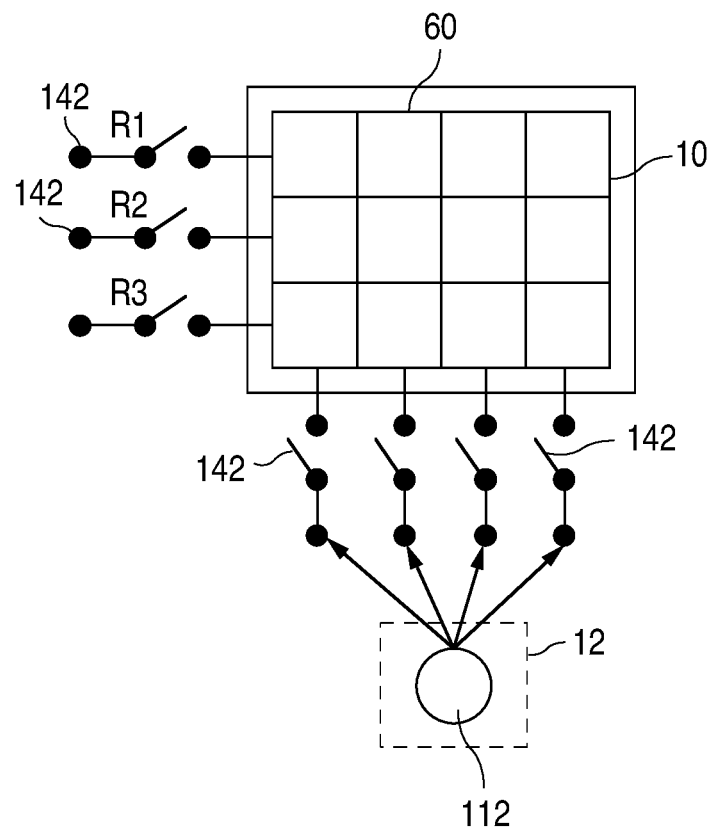
FIG. 16 illustrates a system with a single driver circuit for an array of LEDs.

FIGS. 15 and 16 illustrate structures where a single driver circuit 112 controls multiple LEDs in the array 60 of light source 10. In FIG. 16, the driver 12 includes a single driver circuit 112, which controls all of the LEDs in the array 60. Switches 142 connect the driver circuit 112 to each of the rows and columns of LEDs in the array. By opening and closing the switches 142, the LEDs may be selectively activated. In FIG. 15, a single driver 112 controls each column of three LEDs. There are four driver circuits, one for each column. Switches 144 connect the driver circuits 112 to the rows of LEDs. By opening and closing the switches 144 and activating the corresponding driver, the LEDs may be selectively activated. Though the structure of FIG. 15 illustrates drivers associated with each column, and switches with each row, the reverse may also be used, with drivers associated with each row, and switches with each column. The number of drivers will vary for different LED array configurations, such that the number of drivers may be determined by the number of columns or rows. The switches may be any suitable structure, including, for example, FET switches, such as, for example, MOSFETs.

The use of a single driver circuit 112 as in FIG. 16, or fewer driver circuits than there are LEDs in the array, as in FIG. 15, may reduce the cost of the device. The use of a single driver circuit 112, or fewer driver circuits than there are LEDs, may simplify the solder connections formed on the mount.

In a device with fewer driver circuits than LEDs, such as the devices illustrated in FIGS. 15 and 16, the amount of light produced by each LED may be controlled by both the time (i.e., the on time of each individual LED) and/or by the amount of current supplied to each LED.

Figure 17:
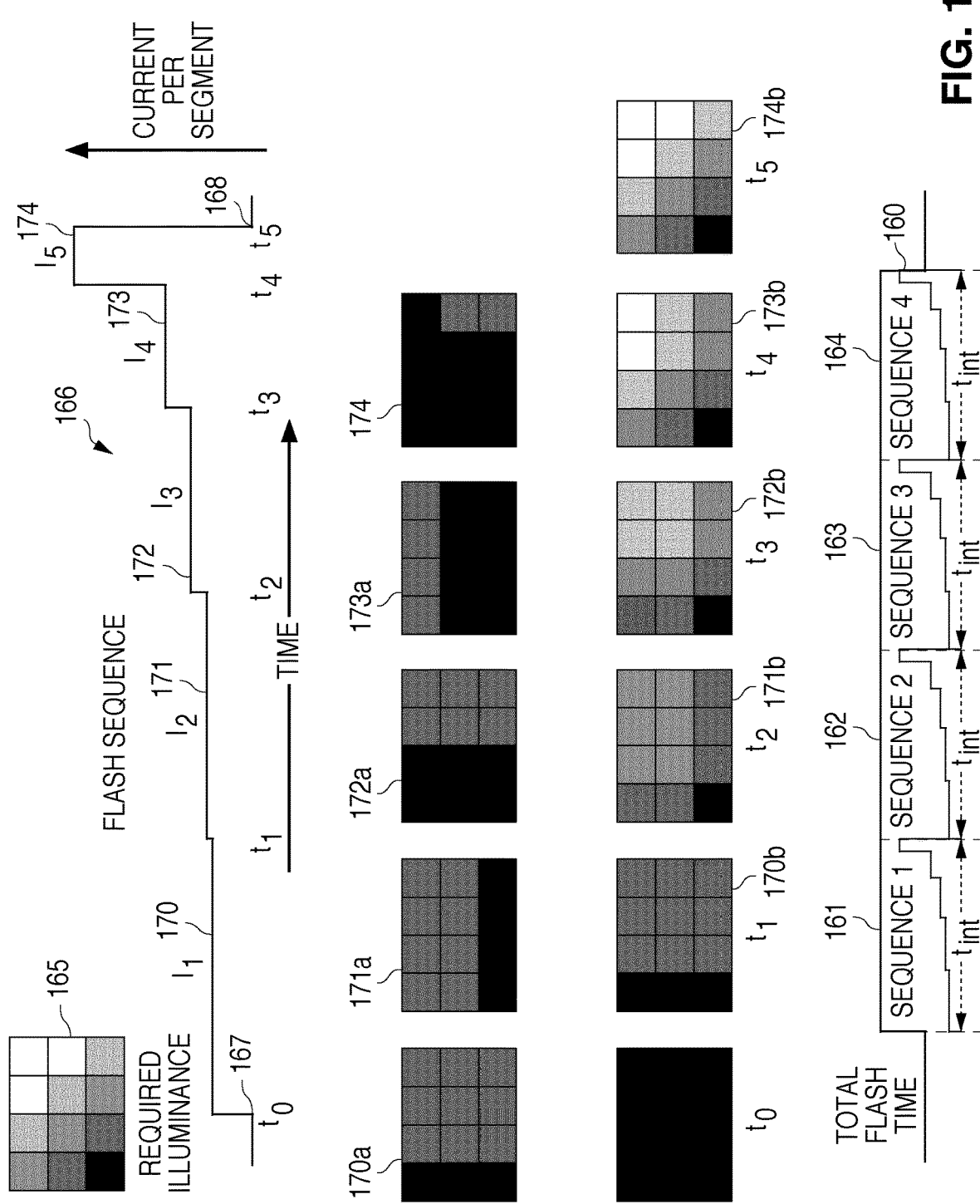
FIG. 17 illustrates a method of illuminating a scene, for the system with the single driver illustrated in FIG. 16.

FIG. 17 illustrates a method of driving the light source 10, using e.g. the system with a single driver circuit 112 illustrated in FIG. 16. In the example of FIG. 17, individual LEDs are selectively energized by closing the corresponding row/column switches during each time period 170-174. In one embodiment, the maximum available current is used continuously during each block 161-164, though the extracted light per LED is modulated by the time it is turned on and by the number of LEDs which are turned on during each time period 170-174. The maximum available current is split evenly among all the LEDs that are energized during a given time period 170-174. In some embodiments, depending on the required illuminance 165, during one or more of the time periods 170-174, the LEDs that are switched on may be driven at less than the maximum available current, depending on the number of LEDs switched on and the maximum allowed current density of the LEDs. Using the maximum available/allowable current during each time period as illustrated, however, will maximize the utilization of the available current and may increase the efficiency of the adaptive flash.

The total flash time 160, as described above in reference to FIG. 12, is illustrated in FIG. 17. The total flash time 160 is divided into multiple blocks 161, 162, 163, and 164. Though four blocks are illustrated, more or fewer may be used, depending on, for example, the total flash time necessary compared to the integration time and trigger uncertainty. Trigger uncertainty is the possible time lag between the exact moment when the picture taking is initiated (moment 126 in FIG. 12), which may not be known outside the camera unit, and any outside event (such as activating the flash) which should be initiated simultaneously. Typical integration times in dimmer environments may be on the order of 10 ms to 100 ms. In some embodiments, a minimum of 2 blocks are used, as the picture read out illustrated in FIG. 12 equals about twice the integration time for each line. The use of only two blocks requires a very precise synchronization between the adaptive flash and the camera (picture start and end). Accordingly, most embodiments use more than 2 blocks.

In each of the four blocks 161, 162, 163, and 164, the LEDs are switched on selectively so as to illuminate in sum the scene according to the required illuminance pattern 165 illustrated in FIG. 17, which may be calculated as described above in FIGS. 2A, 2B, and 2C. The required illuminance pattern 165 is mapped to a target brightness distribution of the LEDs such as the time-averaged brightness distribution achieved until and including the last time period, shown in 174b and described below. (The details of this mapping will depend on the primary and/or secondary optics used with the LED array, as described above. In FIG. 17, for simplicity, the spatial correspondence is assumed to be a simple scaling factor, so averaged brightness distribution until the last time period 174b and illuminance pattern 165 look identical.) Then, by selectively switching on a LED or group of LEDs during each time period, the time-averaged brightness profile 174b can be generated repeatedly during each of the sequences of blocks 161, 162, 163 and 164.

Curve 166 illustrates current per LED as a function of time for each block. Each block 161, 162, 163, and 164 begins at time 167 and ends at time 168. Each block is divided into five time periods 170, 171, 172, 173, and 174. More or fewer time periods may be used. The time periods need not be of the same duration, as illustrated by curve 166. In the example shown, the first time period 170 is the longest, with the lowest current per LED, and the last time period 174 is the shortest, with the highest current per LED.

The total current provided to the array during each time period may be the same and maybe equal to the total available current, though this is not required. As described above, the total current provided to the array is divided equally among the LEDs that are switched on during that time period, in some embodiments.

Arrays 170a, 171a, 172a, 173a, and 174a illustrate how each of the LEDs in the light source array are lit up during each of time periods 170, 171, 172, 173, and 174. In arrays 170a, 171a, 172a, 173a, and 174a, black indicates the LED is off, and grey indicates the LED is on. Arrays 170b, 171b, 172b, 173b, and 174b illustrate the accumulated average luminance emitted during each of time periods 170, 171, 172, 173, and 174. In other words, arrays 170b, 171b, 172b, 173b, and 174b illustrate the sum of emitted light over all previous time periods divided by the elapsed time since start of the block. The shade indicates the amount of light produced—lighter colors indicate more current supplied and more on-time of that segment, thus more light produced, while darker colors indicate less current supplied, shorter on-time and thereby less light produced from the respective LED.

As illustrated by array 170a, during time period 170, nine LEDs in the three right-most columns are driven at current $I_1$. The averaged brightness distribution 170b mirrors the LED driving FIG. 170a, since it is the first time period. As illustrated by array 171a, during time period 171, eight LEDs in the top two rows are driven at current $I_2$. The averaged brightness distribution 171b is greater for the six LEDs corresponding to the top two rows and right-most three columns of LEDs, since these LEDs were switched on during both time period 170 and time period 171. As illustrated by array 172a, during time period 172, six LEDs in the right-most two columns are illuminated at current $I_3$. The averaged brightness distribution 172b is greatest for the four LEDs in the top two rows and right-most two columns, since these LEDs were emitting light during all three time periods 170, 171, and 172. As illustrated by array 173a, during time period 173, four LEDs in the top row are driven at current $I_4$. The averaged brightness distribution 173b is greatest for the two LEDs in the top row and right most columns of the LED array, since these LEDs were illuminated during all time periods. As illustrated by array 174a, during time period 174, two LEDs in the right-most column, bottom two rows are driven at current $I_5$. The averaged brightness distribution 174b is greater for the three LEDs in the top row, right-most two columns and in the second row right-most column, since these LEDs were illuminated during all time periods.

Figure 18:
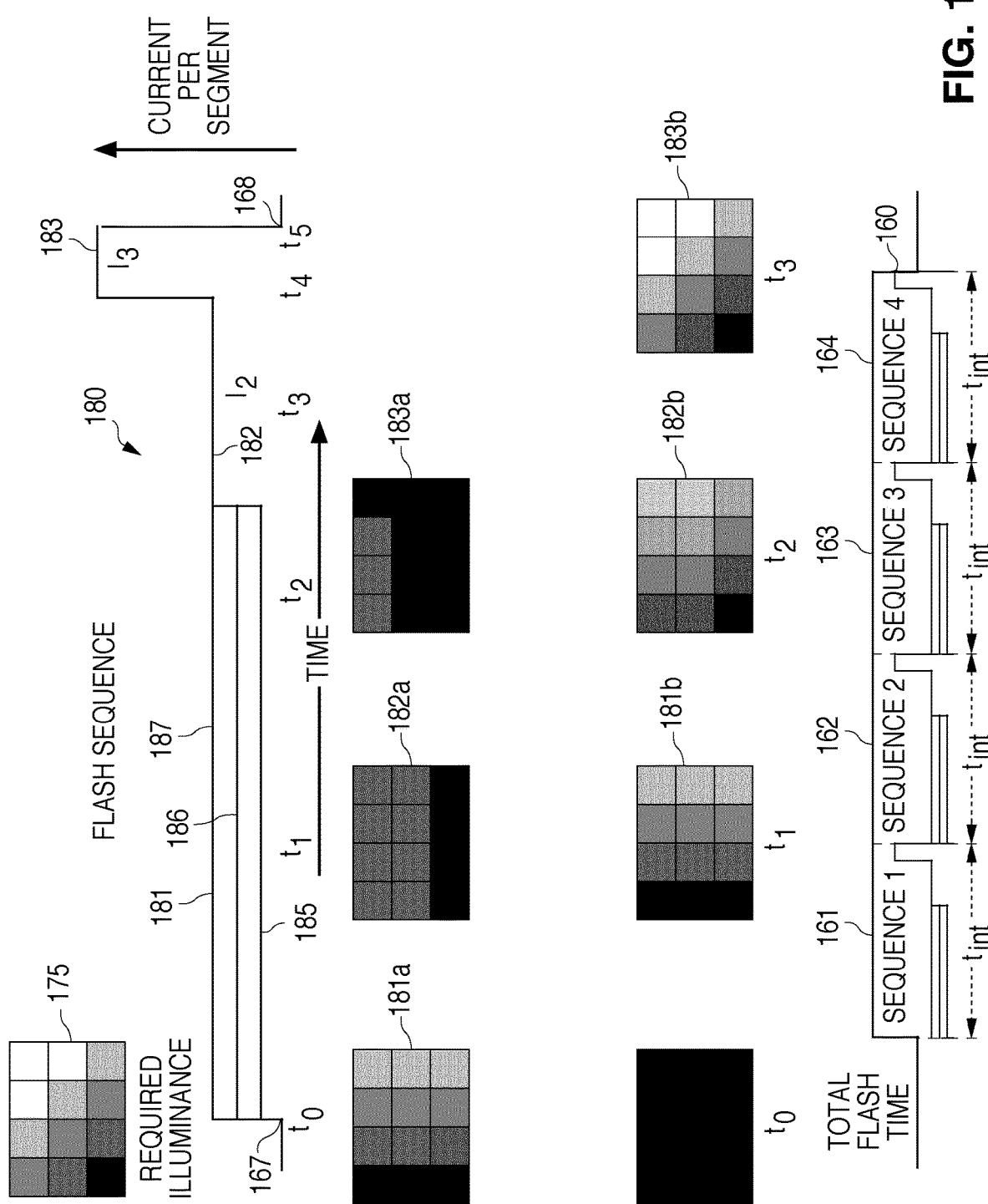
FIG. 18 illustrates a method of illuminating a scene, for the system with the drivers for each row of LEDs, illustrated in FIG. 15.

FIG. 18 illustrates a method of driving the light source 10, using the system with driver circuits 112 for each column of LEDs, illustrated in FIG. 15. In a structure with driver circuits for each column, individual LEDs may be selectively energized by activating the appropriate driver and the appropriate switch, and different amounts of current may be supplied to different columns, but different levels of current cannot be supplied to LEDs in a single column—the total amount of current provided to a given column is split evenly among all the LEDs in that column that are energized. In this configuration, both time modulation and current modulation is used to achieve the desired brightness distribution over the LED array during the time period when the adaptive flash illuminates the scene.

The total flash time 160, as described above in reference to FIG. 12, is illustrated in FIG. 18. As in FIG. 17, the total flash time 160 is divided into multiple blocks 161, 162, 163, and 164. Though four blocks are illustrated, more or fewer may be used, depending on the total flash time necessary compared to the integration time and trigger uncertainty, as described above.

In each of the four blocks 161, 162, 163, and 164, the light source is switched on to achieve the required pattern 175 illustrated in FIG. 18. The required illuminance pattern 175 can be translated, by the optics used, to a brightness distribution of the LED array. This target brightness distribution is achieved by dividing each block into time periods, and selectively powering up a single LED or group of LEDs during each time period, until each LED in the array produces its required average brightness from pattern 183b. In other words, the total generated light from each LED is given by the integration of the luminance produced by that LED during each time period and the final brightness distribution will be the total light emitted per LED segment and solid angle divided by the block time tint from FIG. 18.

Curve 180 illustrates current per activated LED as a function of time for each block. Each block 161, 162, 163, and 164 begins at time 167 and ends at time 168. Each block is divided into three time periods 181, 182, and 183. More or fewer time periods may be used. The time periods need not be of the same duration, as illustrated by curve 180. Time period 181 is in this example the longest and has most of the LEDs on with different current settings per column, and time period 183 is the shortest, with highest current per LED. As described above, the total current provided to the each column is divided equally among the LEDs that are switched on in that column during that time period.

Arrays 181a, 182a, and 183a illustrate how the LEDs in the light source array are lit up during each of time periods 181, 182, and 183. Arrays 181b, 182b, and 183b illustrate the accumulated average luminance during each of time periods 181, 182, and 183. In other words, arrays 181b, 182b, and 183b illustrate the sum of emitted light per LED and solid angle over all previous time periods divided by the elapsed time since the start of the block.

As illustrated by array 181a, during time period 181, nine LEDs in the three right-most columns are emitting light. Each column is driven at a different current level: the second from the left column receives the least current 185, the third from the left column receives more current 186, and the right-most column receives the most current 187. All three LEDs in each column are activated, and therefore all three LEDs in each column emit the same amount of light. The averaged brightness distribution 181b mirrors the LED driving FIG. 181a, since it is the first time period. As illustrated by array 182a, during time period 182, eight LEDs in the top two rows are driven at current $I_2$. The averaged brightness distribution 182b is greatest for the top two LEDs in the right-most column, since these LEDs were switched on during all both time periods 181 and 182. As illustrated by array 183a, during time period 183, three LEDs in the top row, three left-most columns are driven at current $I_3$. The averaged brightness distribution 183b is greatest for the two LEDs in the top row and right most columns.

All the pixels of the camera illustrated in FIG. 12 should see the designated amount of light from light source 10 during integration of that pixel. In other words, during the integration of a pixel, that pixel should be illuminated with the appropriate amount of light as calculated in stages 27, 270, and 2700 in FIGS. 2A, 2B, and 2C above. The pixels of the camera are not collecting light at the same period of time (i.e., different lines of pixels are integrated at different times). In a device with fewer driver circuits than LEDs, the light output per LED varies over time, as illustrated in FIGS. 17 and 18. As a result, light or dark stripes may be recorded if the blocks described above are not synchronized with pixel integration. Accordingly, in some embodiments, the flash sequence (i.e. each block 161, 162, 163, and 164 is a complete flash sequence) is synchronized with the integration time of a pixel. When the flash sequence and integration time are synchronized such that the flash sequence is the same length as the integration time, each pixel sees the complete sequence of time modulated LED array output (i.e., a complete block 161, 162, 163, 164). In particular, when the flash sequence and integration time are synchronized, each pixel in the examples illustrated in FIGS. 17 and 18 sees its illuminance value according to the required illuminance patterns 165 and 175 of FIGS. 17 and 18 as realized via the imaged accumulated brightness distribution illustrated in arrays 174b and 183b.

Synchronizing the flash sequence with the integration time does not require the flash sequence to start at the same time as any of the lines start to integrate, as long as the time lengths of the flash sequence and the integration time are equal, such that during integration of a given line, the pixels being integrated are exposed to an entire flash sequence. In some embodiments, the flash sequence is shorter than the integration time. The length of this shorter flash sequence is selected such that the integration time of a line of pixels is equal to an integer number of flash sequences.

Though the examples above describe using an adaptive light source as a flash, for example of a camera, and though the examples use units for visible light other uses are contemplated and are within the scope of the invention. The methods and structures described herein such as, for example, maximizing total current available to an array of LEDs by switching on more than one LED at a time, switching between columns and rows in an LED array such that the time-averaged power distribution (or brightness) across the LED array corresponds to a predetermined power distribution (or brightness), switching individual LEDs in an LED array on and off to use the total current available to the array all the time without subjecting individual LEDs to an inefficiently high current density, and matching the length of the illuminating sequence to a separate, external operation (such as, for example, the taking of a picture), may be used in any suitable application and are not limited to the flash application described in the examples above.

Having described the invention in detail, those skilled in the art will appreciate that, given the present disclosure, modifications may be made to the invention without departing from the spirit of the inventive concept described herein. In particular, different elements from different examples or embodiments may be combined. It is not intended that the scope of the invention be limited to the specific embodiments illustrated and described.

The invention claimed is:

1. A method, comprising:
selectively energizing LEDs in an LED array for an illuminance pattern, the LEDs in the array being arranged in rows and columns, each LED of the LED array being electrically connected to a respective row and to a respective column;
selectively energizing LEDs in the LED array, a selected LED being selectively energized using a single driver circuit to selectively switch on a row and a column to which the selected LED is electrically connected, each of the LEDs in the LED array being selectively energized for a plurality of time periods, at least two LEDs in the LED array being energized during each time period, the plurality of time periods being grouped in a time sequence such that a sum of light emitted by each of the LEDs of the LED array over all periods in the time sequence divided by a total time of the time sequence corresponds to an amount of light to be emitted by each LED in the LED array for obtaining the illuminance pattern;

capturing an image of a field of view illuminated by the LED array; and repeating the selectively energizing the LEDs in the LED array for the plurality of time periods grouped in the time sequence, the repeating occurring during the capturing of the image.

2. The method of claim 1 wherein during each time period, a maximum available current for the LED array is evenly divided among the LEDs energized during that time period.

3. The method of claim 1 wherein the LEDs in the LED array are electrically connected to row and column switches, wherein selectively energizing the LEDs in the LED array comprises selectively activating the row and column switches and energizing the selected LEDs using the single driver circuit.

4. The method of claim 1 wherein:

the LEDs in the LED array are electrically connected to row switches, the LEDs in the LED array are electrically connected to a driver circuit per column, and selectively energizing the LEDs in the LED array comprises selectively activating the row switches and selectively activating the column driver circuits and energizing the selected LEDs using as many driver circuits as there are columns in the LED array.

5. A method, comprising:

for a field of view comprising a plurality of portions, determining an amount of light for each portion;

selectively energizing LEDs corresponding to each portion over a plurality of time periods, such that a sum of illumination generated by each LED during the plurality of time periods equals the determined amount of light for each portion, said selectively energizing comprising driving the LEDs in a sequence;

capturing an image of the field of view; and repeating the sequence during said capturing an image of the field of view.

6. The method of claim 5 wherein:

the field of view is divided into a plurality of rows of pixels;

capturing an image of the field of view comprises recording an image sequentially captured by each row of pixels; and a duration of the sequence is equal to a duration used to record a row of pixels.

7. The method of claim 5 wherein:

the field of view is divided into a plurality of rows of pixels;

capturing an image of the field of view comprises recording an image sequentially captured by each row of pixels; and selectively energizing comprises synchronizing the sequence with said recording each row of pixels one after another such that during said recording each row of pixels, the row of pixels being recorded receives the determined amount of light corresponding to the portion or portions in which the row of pixels being recorded is located.

8. The method of claim 5 wherein selectively energizing comprises switching on a first group of the LEDs during a first time period and switching on a second group of the LEDs during a second time period, wherein the first group is different from the second group.

9. The method of claim 5 wherein said selectively energizing LEDs corresponding to each portion over a plurality of time periods occurs multiple times during said capturing an image of the field of view.

10. A structure, comprising:

a camera configured to capture an image of a field of view, the field of view being divided into a plurality of lines of pixels;

a light source comprising an array of LEDs, each LED in the array corresponding to a portion of the field of view and connected to a row of LEDs and to a column of LEDs, each LED being energizable by switching on the row and the column to which the selected LED is connected; and a driver coupled to the array of LEDs and configured to switch on one or more columns or one or more rows and to selectively energize the LEDs over a plurality of time periods, at least two LEDs in the LED array being energized during each time period, the plurality of time periods being grouped in a time sequence such that a sum of illumination generated by each LED during all time periods of the time sequence equals a pre-determined amount of light for each portion of the field of view, the driver further configured to repeat the selective energizing of the LEDs while the camera captures the image of the field of view.

* * * * *